April 18, 1967  C. H. DIETZ ETAL  3,314,711
LIFTING AND HANDLING APPARATUS
Filed June 4, 1965

INVENTORS.
CLIFFORD H. DIETZ, DONALD H. PIKE,
WILLIAM R. COX, JR. and
WALTER W. ELLIOTT
BY Lockwood, Woodard, Smith & Weikart
Attorneys

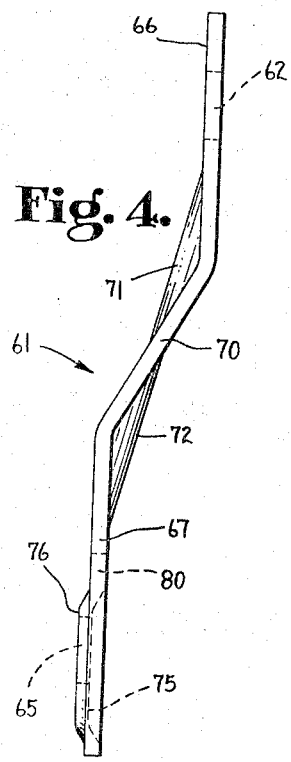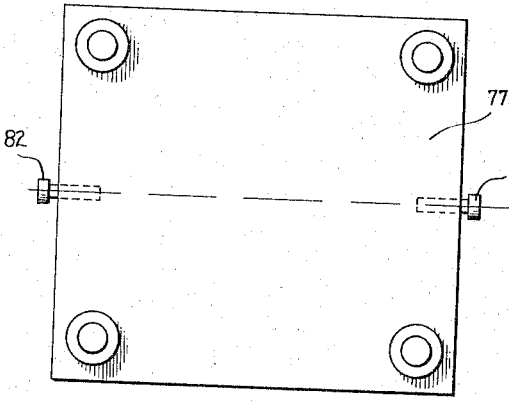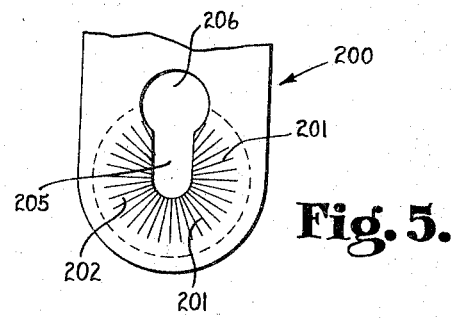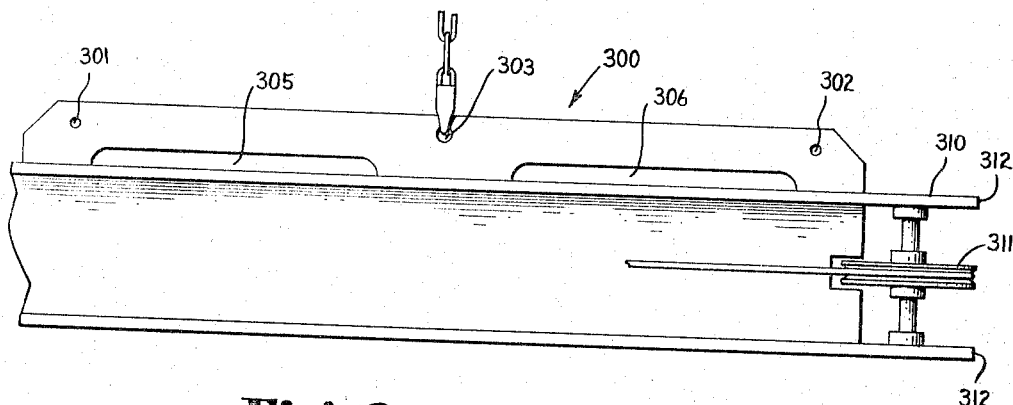
INVENTORS
CLIFFORD H. DIETZ, DONALD H. PIKE,
WILLIAM R. COX, JR. and
WALTER W. ELLIOTT
BY Lockwood, Woodard, Smith & Weikart
Attorneys

United States Patent Office 3,314,711
Patented Apr. 18, 1967

3,314,711
LIFTING AND HANDLING APPARATUS
Clifford H. Dietz, Donald H. Pike, William R. Cox, Jr., and Walter W. Elliott, all of Indianapolis, Ind., assignors to Engineered Models Corporation, Indianapolis, Ind., a corporation of Indiana
Filed June 4, 1965, Ser. No. 461,406
15 Claims. (Cl. 294—78)

The present invention relates to lifting and handling apparatus particularly adapted for use in lifting and handling of die sets.

Die sets are relatively heavy objects and may range in weight as high as two or three tons or more. Such die sets are conveniently handled by means of apparatus such as movable A-frame cranes with an electric or manual hoist attachment. The hoist attachment is frequently connected to the die set or to one of the plates of the die set by means of a hook and possibly by means of a C-clamp. When the die set and the plates thereof are handled and transported in this manner, it frequently requires perhaps two, three of four men to handle manually a die set plate weighing, for example, approximately 600 pounds. Consequently, it is an important object of the present invention to reduce the number of men necessary to handle a die set or the plates thereof.

A further general object of the present invention is to provide lifting and handling apparatus for lifting and handling heavy weights.

Another object of the present invention is to provide lifting and handling apparatus particularly adapted for transporting and overturning flat plates such as those forming one of the plates of a die set.

Still another object of the present invention is to provide lifting and handling apparatus which facilitates the attachment of a shipping strap to a die set for transporting thereof to the customer.

Related objects and advantages will become apparent as the description proceeds.

One embodiment of the present invention might include a support element, means for lifting said support element at the central portion thereof, a pair of carriages mounted on said support element for movement toward and away from one another, a pair of flexible lines each secured to a respective one of said carriages and supporting an object to be lifted, and control means restricting movement of said carriages to equidistant movement away from and toward the central portion of said support element.

The full nature of the invention will be understood from the accompanying drawings and the following description and claims.

FIG. 4 is an enlarged side elevation of the structure illustrated in FIG. 3.

FIG. 5 is a fragmentary front elevation of a connecting link forming an alternative embodiment of the present invention.

FIG. 6 is a view similar to FIG. 1 but enlarged and fragmentary in nature and illustrating an alternative embodiment of the present invention.

FIG. 7 is a top plan view of the die plate and more particularly the top die plate as illustrated in FIG. 1 also known as a punch holder and showing the modification made in the die plate for use with the present invention.

Figure 1:
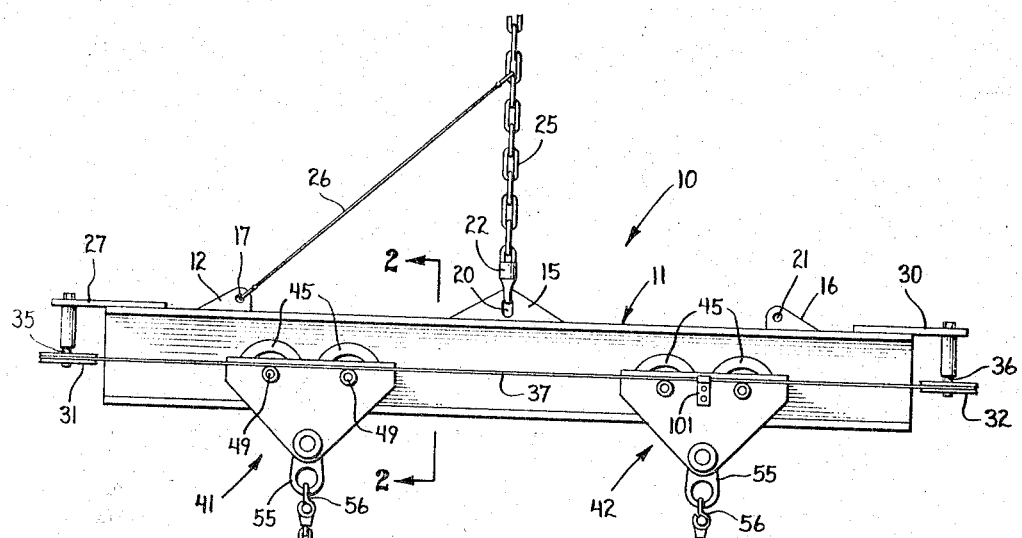
FIG. 1 is a front elevation of lifting and handling apparatus embodying the present invention.

For the purposes of promoting an understanding of the principles of the invention, reference will now be made to the embodiment illustrated in the drawing and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is illustrated a lifting and handling apparatus 10 which includes an I-beam 11. Fixed to the top of the I-beam 11 are three members 12, 15 and 16, each of which provides an aperture 17, 20 and 21. The aperture 20 is used for connecting a hook 22 on the distal end of a chain 25 in order to provide means for lifting and transporting the I-beam. The chain 25 and hook 22 may form a part of the chain fall of a movable A-frame crane or may form a part of the chain fall of a crane arrangement mounted on the ceiling of a plant.

In using the present apparatus, it is desirable at times that the I-beam 11 be retained at a particular desired angle which is the same as the object being lifted. This is accomplished by connecting a bracket or link 26 between the chain 25 and one of the apertures 17 or 21. As illustrated in FIG. 1, the bracket or link 26 is connected to the aperture 17 and to the chain 25 and retains the I-beam 11 in a horizontal position. It should be understood, however, that the present device can be used without the link or bracket 26 because of the fact that the support of the I-beam is at the center of gravity and, consequently, the I-beam will normally assume the horizontal position illustrated without the link or bracket 26. Secured to the opposite ends of the I-beam 11 are pulley-mounting members 27 and 30. The members 27 and 30 mount pulleys 31 and 32 which are aligned with one another in a horizontal direction and which are rotatable about vertical axes provided by mounting shafts 35 and 36 mounted upon the two members 27 and 30. Received about the pulleys 31 and 32 is a cord or line 37 which extends parallel to the I-beam 11 on both sides thereof.

Figure 2:
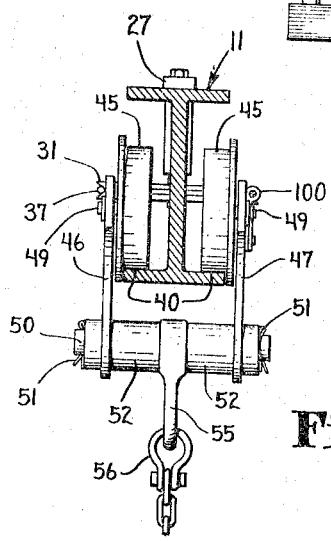
FIG. 2 is an enlarged vertical section taken along the line 2—2 of FIG. 1 in the direction of the arrows.

As shown in FIG. 2, the cross-section of the I-beam 11 is upright so that the lowermost flanges 40 extend oppositely and horizontally. A pair of carriages 41 and 42 are mounted upon the I-beam 11 so as to roll along the oppositely extending flanges 40. Each of the carriages 41 and 42 includes four rollers 45. Two of the rollers of each carriage roll upon one of the flanges 40 while the other two of the rollers of each carriage roll upon the other of the flanges 40.

Each of the carriages 41 and 42 further includes a pair of side member 46 and 47 in which are mounted stub shafts 49 which rotatably mount the rollers 45. The side members 46 and 47 of each carriage extend downwardly and have mounted thereon a rod 50 with cotter pins 51 retaining the rod within spacers 52 which also function to maintain a link member 55 centrally of the carriages 41 and 42. Each of the link members 55 mounts a further link member 56 to which is secured a chain 57.

Figure 3:
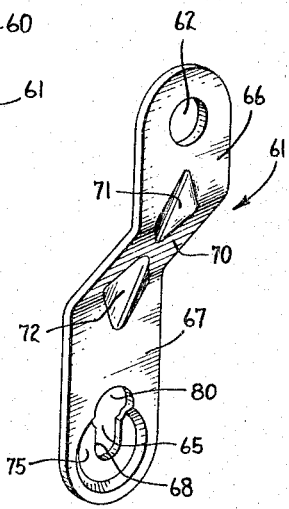
FIG. 3 is a perspective view of a connecting link forming a part of the present invention.

At the lower end of each of the chains 57 there is secured a link member 60 which is bolted to a connecting link 61. The connecting link 61 is formed from a flat section of metal which is elongated as shown in FIGS. 3 and 4 and has holes 62 and 65 formed in the opposite ends thereof. The upper end 66 of the member 61 is parallel to but offset from the lower end 67 of the member, the two ends being connected by a diagonally extending portion 70. The member 61 is re-enforced by deformed portions or ribs 71 and 72 which extend through the connection, respectively, of the one end portion 66 and the diagonally extending portion 70 and the connection of the diagonally extending portion 70 and the other end portion 67. It will be noted that the hole or opening 65 through the lower end portion 67 is keyhole shaped with the reduced portion 68 of the keyhole being down or toward the lower end of the member 61.

The lower end 67 of the member 61 is also deformed into a circular shape at 75 with the center of the circular shape being located at the center of the reduced portion of the keyhole shaped opening 65. The deformed portion 75, as is best shown in FIG. 4, provides a bearing surface 76 which engages the punch holder or top plate 77 being lifted as shown in FIG. 1. This bearing surface 76 assists the free pivoting of the link 61 relative to the punch holder.

It can be appreciated that in order to mount the link 61 on the plate 77 for the lifting and handling thereof, it is necessary to place the enlarged portion 80 of the keyhole shaped slot 65 on one of the screws 81 shown in FIG. 7 and also FIG. 1. Referring to FIG. 7, there is illustrated a top plan view of the punch holder 77. It can be seen that the screws 81 and 82 are located on the opposite sides of the punch holder so that their axes extend through the center of gravity of the punch holder. Such screws as the screws 81 and 82 are particularly useful in securing shipping straps to the punch holder 77 and the lower plate 85 of the die set for use in shipping was die set.

The screws 81 and 82 also form an important part of the present invention because they are used to mount or secure the links 61 in a pivotal fashion to the plate 77 to be lifted. It can be appreciated that the links are secured to the plate by slipping the heads of the screws 81 and 82 through the enlarged portion 80 of the keyhole shaped slot and then by lifting the apparatus illustrated in FIG. 1 upwardly by means of an electrically operated or manual hoist until the links 61 securely seat themselves with the reduced portions of the keyhole shape slots cradling and surrounding the shank of screws 81 and 82.

It is particularly desirable when lifting an object such as the plate 77 that the chains 57 be vertical and be spaced slightly away from the plate 77 so that the plate 77 can be rotated about its center of gravity for overturning the plate. Also, it is desirable that the lifting of the plate 77 be in such a manner that the plate is not bent. Such bending can occur when the plate 77 is lifted by a pair of conventional downwardly diverging chains connected to a single chain fall, such lifting causes the clearance between the bearings mounted within the plate 77 and the upright posts 86 to be modified so that the plate 77 will no longer freely slide upon the posts 86 thus interfering with the proper operation of the die set. The diagonal portion 70 of the links 61 provides means for spacing the chains 57 away from the plate 77 so that the plate can be easily overturned when it has been lifted by the apparatus of the present invention.

The means for maintaining the chains 57 vertical includes the securing of one of the carriages 41 to the cord or line 37 at 100, that is, on the other side of the I-beam as viewed in FIG. 1 and the securing of the carriage 42 to the cord or line 37 at 101, that is, on the opposite side of the I-beam or on the visible side of the I-beam as viewed in FIG. 1. Thus, when the carriage 41 moves outwardly or away from the carriage 42, the carriage 42 also moves an equal amount; and when the carriage 41 moves inwardly or toward the carriage 42 the carriage 42 also moves an equal amount but always in the opposite direction so that the two carriages move together simultaneously or apart simultaneously. This movement also causes the composite I-beam carriage assembly to always have its center of gravity remain at the same point because of the fact that the two carriages 41 and 42 are equal in weight. For this reason, the link 26 never supports appreciable weight and, in fact, it is not necessary to use the link 26 unless it is desired to maintain the I-beam at some particular angle. From the above, it will be appreciated that the carriages 41 and 42 and the manner in which they are controlled by the cord or line 37 makes possible the maintaining of the chains 57 vertical no matter what the size of the plate 77. Thus, if the plate 77 is of greater dimension than that illustrated, the two carriages will move an equal amount outwardly away from the center of gravity of the I-beam. If the size of the plate 77 is smaller than that illustrated, the carriages will move inwardly.

It should also be appreciated that if the die set, including plates 77 and 85 is positioned at an angle, the link or bracket 26 can be used to position the I-beam 11 at the same angle as the plate 77. The chain 25 can then be secured to its A-frame or supporting structure in such a way that the I-beam 11 is easily movable horizontally and there is no braking action on the chain 25 hindering horizontal movement of the I-beam. Then the plate 77 can be lifted on an angle but the I-beam 11 will also move due to the fact that the chain 25 is not restricted or held to any particular position. Thus, the plate 77 can be easily removed from the die set even though the die set is arranged at an angle.

Referring now to FIG. 5, there is illustrated an alternative embodiment of the present invention. The embodiment of FIG. 5 is a link 200 which is identical to the link 61 except for the radially extending ridges 201 which are formed on the face 202 corresponding to the face 76 of the raised portion 75 of FIG. 4. The ridges 201 are centered at the center of the reduced portion 205 of the keyhole shaped opening 206. In all other respects the embodiment of FIG. 5 is identical to the embodiment illustrated in FIGS. 3, 4 and 1. The purpose of the ridges 201 is to provide a locking action making possible the links 200 retaining the plate 77 in a given position when the screws 81 and 82 are tightened. It should be understood that the sides of the plate 77 are somewhat jagged owing to the fact that the plates are cut by means of torches. Thus, the ridges 201 act to lock the plate in any given position after the screws have been tightened down against the rearward surface of the links 200.

In FIG. 6 there is illustrated a further alternative embodiment of the present invention which is identical to the embodiment illustrated in FIG. 1 except for the member 300 and as further described below. The member 300 replaces the members 15, 12 and 16 of FIG. 1 and also provides an additional function. The apertures 301 and 302 replace the apertures 17 and 21 of FIG. 1. The aperture 303 replaces the aperture 20 of FIG. 1. The member 300 has also formed therein elongated apertures 305 and 306 which extend lengthwise of the I-beam 310 and make possible the lifting of the I-beam by means of the tines of a lift-truck. The embodiment of FIG. 6 is also different than the embodiment of FIG. 1 in that the pulleys 311 of FIG. 6 are mounted between the flanges 312 of the I-beam and are protected by the flanges 312. A portion of the web of the I-beam is removed in order to provide a protected location for the mounting of the pulleys 311 as illustrated.

It will be evident from the above description that the present invention provides an improved device for lifting and handling heavy objects, such as, for example, the plates of a die set. It will also be obvious that the present invention automatically provides a vertical pull or lifting action upon the plate being lifted. Because this vertical pull is automatically provided, the links 61 are freely pivotal relative to the plate being lifted and the plate being lifted can be easily overturned by relatively little manpower. It has been found in actual use of the present invention that a single man can handle a 600-pound plate where previously three men were required to handle such a plate. Even so the cost of the present apparatus is extremely low and may run approximately $200 whereas powered devices capable of producing the same results as the present invention would cost approximately $2,000.

While the invention has been illustrated and described in detail in the drawings and foregoing description, the same is to be considered as illustrative and not restrictive

The invention claimed is:

1. Lifting and handling apparatus comprising a support element, means for lifting said support element at the central portion thereof, a pair of carriages mounted on said support element for movement toward and away from one another, a pair of flexible lines each secured to a respective one of said carriages and supporting an object to be lifted, and control means restricting movement of said carriages to equa-distant movement away from and toward the central portion of said support element.

2. Lifting and handling apparatus comprising a support element, means for lifting said support element at the center of gravity thereof, a pair of carriages mounted on said support element for movement toward and away from one another, a pair of flexible lines each secured to a respective one of said carriages and supporting an object to be lifted, and control means restricting movement of said carriages to only such movement as maintains the center of gravity of said support element at the same position.

3. Lifting and handling apparatus comprising an elongate element, a pair of carriages mounted on said elongate element for movement longitudinally thereof, a pair of pulleys one mounted at one end of said elongate element and the other at the other end of said element, a closed pulley line trained around said pulleys, said line being secured to one of said carriages on one side of said elongate element and secured to the other of said carriages on the other side of said elongate element, means for lifting said elongate element secured thereto centrally thereof, said carriages being equally spaced on opposite sides of said means and maintained so spaced by said line as said carriages move inwardly toward the center of said elongate element and outwardly away from the center of said element, a pair of flexible lines each secured to one of said carriages, a pair of connecting links each secured at one end to one of said pair of lines and pivoted at an opposite end to an object to be transported.

4. Lifting and handling apparatus as defined in claim 3 wherein said elongate element is an I-beam with the I cross-section thereof upright, said carriages being hung on the lowermost flanges of the I-beam, four rollers rotatably mounted on each of said carriages, two of said rollers of each carriage on one of the lowermost flanges and the other two of said rollers of each carriage on the other of said lowermost flanges and supporting each carriage on the I-beam.

5. Lifting and handling apparatus as defined in claim 4 wherein said means for lifting said I-beam is a chain, said I-beam having an aperture therethrough on the upper surface thereof, a link connected at one end to said chain and at the other end to said aperture for positioning said I-beam at a desired angle.

6. Lifting and handling apparatus as defined in claim 4 wherein said I-beam has its web partially cut away to provide a protective housing for said pulleys, said pulleys being rotatably mounted on and between the flanges of said I-beams to provide protection for said pulleys.

7. Lifting and handling apparatus as defined in claim 4 additionally comprising a member secured to the upper surface of said I-beam, said member having three apertures therethrough, one of said apertures being positioned centrally of said member and adapted to receive said means for lifting said I-beam, the other two of said apertures being positioned adjacent the ends of said I-beam and adapted to receive a link for setting the angle of said I-beam relative to the horizontal, said member having two further apertures which are elongated and extend in the direction of length of said I-beam for receiving the tines of a lift-truck.

8. Lifting and handling apparatus as defined in claim 3 wherein each of said connecting links comprises a thin elongated member with a pair of holes therethrough one at one end thereof and the other at the other end thereof, the opposite ends of said member being parallel and connected by a diagonally extending portion.

9. Lifting and handling apparatus as defined in claim 8 wherein one of said holes is keyhole shaped with the enlarged portion of the keyhole away from and the reduced portion of the keyhole toward the one end of said member.

10. Lifting and handling apparatus as defined in claim 9 wherein said member is deformed to provide a circular shaped raised portion with its center at the center of said reduced portion of said keyhole shaped hole.

11. Lifting and handling apparatus as defined in claim 10 wherein said member has formed on said raised portion a plurality of ridges extending radially of the reduced portion of the keyhole shaped hole.

12. Lifting and handling apparatus comprising an I-beam having the I cross-section thereof upright and a pair of oppositely projecting lowermost flanges, carriages hung on the lowermost flanges of the I-beam, four rollers rotatably mounted on each of said carriages, two of said rollers of each carriage on one of the lowermost flanges and the other two of said rollers of each carriage on the other of said lowermost flanges and supporting each carriage on the I-beam, and means for maintaining said carriages equidistant from the center of said I-beam.

13. Lifting and handling apparatus as defined in claim 12 additionally comprising chain means for lifting said I-beam and connected to the upper surface thereof, said I-beam having an aperture therethrough on the upper surface thereof spaced from said chain means, and a link connected at one end to said chain and at the other end to said aperture for positioning said I-beam at a desired angle.

14. Lifting and handling apparatus as defined in claim 12 wherein said I-beam has its web partially cut away to provide a protective housing for pulleys, said means for maintaining said carriages equidistant comprising pulleys rotatably mounted on and between the flanges of said I-beams, and a closed line trained on said pulleys and secured to one carriage on one side of said I-beam and the other carriage on the other side of said I-beam.

15. Lifting and handling apparatus as defined in claim 12 additionally comprising a member secured to the upper surface of said I-beam, said member having three apertures therethrough, one of said apertures being positioned centrally of said member and adapted to receive means for lifting said I-beam, the other two of said apertures being positioned adjacent the ends of said I-beam and adapted to receive a link for setting the angle of said I-beam relative to the horizontal, said member having two further apertures which are elongated and extend in the direction of length of said I-beam for receiving the tines of a lift-truck.

References Cited by the Examiner

UNITED STATES PATENTS

| | | | |
|---|---|---|---|
| 2,199,378 | 6/1938 | Wells | 294—92 |
| 2,413,280 | 12/1946 | Ashenden | 294—78 X |
| 2,622,540 | 12/1952 | Stewart et al. | 294—81 X |
| 3,076,673 | 2/1963 | Kaplan et al. | 294—81 |

HUGO O. SCHULZ, *Primary Examiner.*